(12) United States Patent
Jung et al.

(10) Patent No.: US 7,549,760 B2
(45) Date of Patent: Jun. 23, 2009

(54) BACKLIGHT ASSEMBLY, LIQUID CRYSTAL DISPLAY APPARATUS HAVING THE SAME AND METHOD THEREOF

(75) Inventors: Dae-Yoon Jung, Yongin-si (KR); Kwang-Hoon Lee, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 127 days.

(21) Appl. No.: 11/676,566

(22) Filed: Feb. 20, 2007

(65) Prior Publication Data

US 2007/0268721 A1 Nov. 22, 2007

(30) Foreign Application Priority Data

May 20, 2006 (KR) .................... 10-2006-0045390

(51) Int. Cl.
*F21V 7/04* (2006.01)
*F21V 5/00* (2006.01)

(52) U.S. Cl. .................. 362/97; 362/606; 362/609; 362/614; 362/618; 349/62; 349/64

(58) Field of Classification Search ............. 362/606, 362/607, 609, 610, 611, 612, 613, 614, 616, 362/617, 618, 619, 561, 97; 349/62, 64; 359/599
See application file for complete search history.

(56) References Cited

U.S. PATENT DOCUMENTS

| 5,384,658 | A | * | 1/1995 | Ohtake et al. ............. 359/707 |
| 5,598,281 | A | * | 1/1997 | Zimmerman et al. ........... 349/5 |
| 6,843,582 | B2 | * | 1/2005 | Chang ....................... 362/240 |
| 7,160,017 | B2 | * | 1/2007 | Lee et al. ................... 362/620 |
| 7,338,184 | B2 | * | 3/2008 | Chen et al. ................. 362/246 |
| 7,364,336 | B2 | * | 4/2008 | Mori et al. ................. 362/560 |
| 2003/0026096 | A1 | * | 2/2003 | Ellens et al. ............... 362/231 |
| 2008/0192174 | A1 | * | 8/2008 | Odake et al. ................. 349/62 |

FOREIGN PATENT DOCUMENTS

JP    2005352426    12/2005

* cited by examiner

*Primary Examiner*—Jacob Y Choi
(74) *Attorney, Agent, or Firm*—Cantor Colburn LLP (57) ABSTRACT

A backlight assembly includes a plurality of lamps, a first reflecting plate and an optical member. The lamps are disposed substantially parallel with each other and generate light. The bottom reflecting plate is disposed under the lamps to reflect the light. The first reflecting plate is disposed over the lamps to transmit and reflect the light and has a plurality of penetration holes for transmitting the light. The optical member is disposed over the first reflecting plate. The formation density of the penetration holes increases as a position of the penetration holes approaches an intermediate region between adjacent lamps from a region corresponding to a position of the lamps.

16 Claims, 9 Drawing Sheets

BACKLIGHT ASSEMBLY, LIQUID CRYSTAL DISPLAY APPARATUS HAVING THE SAME AND METHOD THEREOF

This application claims priority to Korean Patent Application No. 2006-45390 filed on May 20, 2006, and all the benefits accruing therefrom under 35 U.S.C. §119, the contents of which are herein incorporated by reference in its entirety.

BACKGROUND OF THE INVENTION

1. Field of the Invention

The present invention relates to a backlight assembly and a display apparatus having the backlight assembly. More particularly, the present invention relates to a backlight assembly capable of reducing a manufacturing cost and decreasing a thickness of the backlight assembly, and a display apparatus having the backlight assembly.

2. Description of the Related Art

A liquid crystal display ("LCD") apparatus needs a backlight assembly to provide an LCD panel with light because the LCD panel displaying images is a non-luminous device, which does not emit light by itself.

The backlight assembly may be classified as either an edge-illumination type or a direct-illumination type according to a position of a lamp that emits light. According to the edge-illumination type backlight assembly, a lamp is disposed at an edge of a light guide plate. The edge-illumination type backlight assembly has an advantage of a thinner thickness, but an optical efficiency of the edge-illumination type backlight assembly is relatively low and a cost of the device increases due to the light guide plate.

In comparison, according to the direct-illumination type backlight assembly, a plurality of lamps is disposed under a light guide plate in parallel with each other. The direct-illumination type backlight assembly has an advantage of a high brightness, but a thickness and a cost of the direct-illumination type backlight assembly increase due to the numerous lamps.

BRIEF SUMMARY OF THE INVENTION

An exemplary embodiment provides a backlight assembly capable of increasing an optical efficiency despite having a similar thickness to an edge-illumination type, and reducing a manufacturing cost through excluding a light guide plate.

In an exemplary embodiment of a backlight assembly, the backlight assembly includes a plurality of lamps, a bottom reflecting plate, a first reflecting plate and an optical member. The lamps are disposed substantially parallel with each other and generate light. The bottom reflecting plate is disposed under the lamps to reflect the light. The first reflecting plate is disposed over the lamps to transmit and reflect the light. The first reflecting plate has a plurality of penetration holes for transmitting the light. The optical member is disposed over the first reflecting plate.

In an exemplary embodiment, the first reflecting plate may be formed so that a formation density of the penetration holes varies correspondingly to a position of the lamps. The formation density of the penetration holes may increase as a position of the penetration holes approaches a region corresponding to an intermediate region between adjacent lamps from a region corresponding to a position of the lamps.

In an exemplary embodiment, the optical member may include a diffusing plate diffusing the light passing through the first reflecting plate, a diffusing sheet disposed over the diffusing plate and a condensing sheet disposed over the diffusing plate. The first reflecting plate may be attached and fixed to a bottom surface of the diffusing plate.

In an exemplary embodiment of a backlight assembly, the backlight assembly includes a plurality of lamps disposed substantially parallel with each other producing light, a bottom reflecting plate disposed under the lamps to reflect the light, a diffusing plate disposed over the lamps to diffuse the light and a printed pattern layer formed at a bottom surface of the diffusing plate facing the lamps. The printed pattern has a plurality of penetration holes for transmitting the light.

In an exemplary embodiment, the printed pattern layer may be patterned with an ink reflecting light. A formation density of the penetration holes of the printed pattern layer may increase as a position of the penetration holes approaches a region corresponding to an intermediate region between the neighboring lamps from a region corresponding to a position of the lamps.

In an exemplary embodiment of a display apparatus, the display apparatus includes a plurality of lamps disposed substantially parallel with each other producing light, a bottom reflecting plate disposed under the lamps to reflect the light, a first reflecting plate disposed over the lamps to transmit and reflect the light, an optical member disposed over the first reflecting plate and a display panel disposed over the optical member. The display panel displays images via the light passing through the optical member. The first reflecting plate has a plurality of penetration holes for transmitting the light.

In an exemplary embodiment of a display apparatus, the display apparatus includes a plurality of lamps disposed substantially parallel with each other and producing light, a bottom reflecting plate disposed under the lamps to reflect the light, a diffusing plate disposed over the lamps to diffuse the light, a printed pattern layer formed at a bottom surface of the diffusing plate facing the lamps and a display panel disposed over the diffusing plate. The display panel displays images. The printed pattern layer is patterned with an ink to reflect the light and has a plurality of penetration holes for transmitting the light.

In an exemplary embodiment, a method of forming a backlight display provides forming a first reflecting plate including a transmission region transmitting light and a reflective region reflecting light generated by a plurality of lamps, disposing a second reflecting plate under the plurality of lamps generating the light; and disposing the first reflecting plate over the plurality of lamps generating the light. The forming a first reflecting plate includes forming a plurality of penetration holes in the transmission region. A formation density of the penetration holes is increased in an intermediate region between adjacent lamps from a lamp region.

According to the above mentioned backlight assembly and display apparatus having the backlight assembly, an optical efficiency may improve. A light guide plate may be excluded, so that a thickness of a backlight assembly may be reduced and a manufacturing cost may be retrenched.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "on" or "onto" another element, it may be directly on the other element or intervening elements may also be present. In contrast, when an element is referred to as being "directly on" another element, there are no intervening elements present. Like reference numerals refer to similar or identical elements throughout. In the drawings, the size and relative sizes of layers and regions may be exaggerated for clarity.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "under," "above" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" other elements or features would then be oriented "above" the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
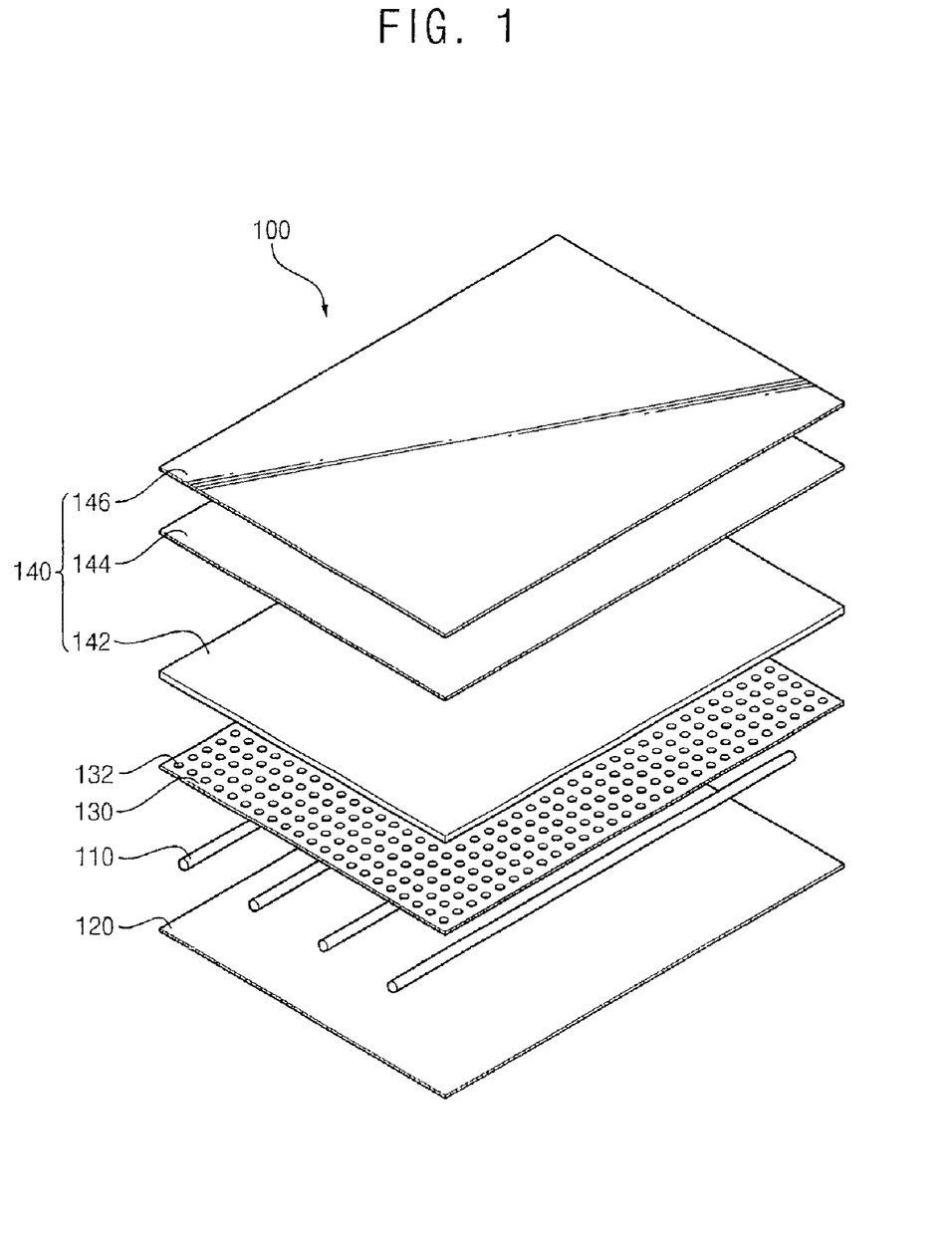
FIG. 1 is an exploded perspective view illustrating an exemplary embodiment of a backlight assembly according to the present invention.
Figure 2:
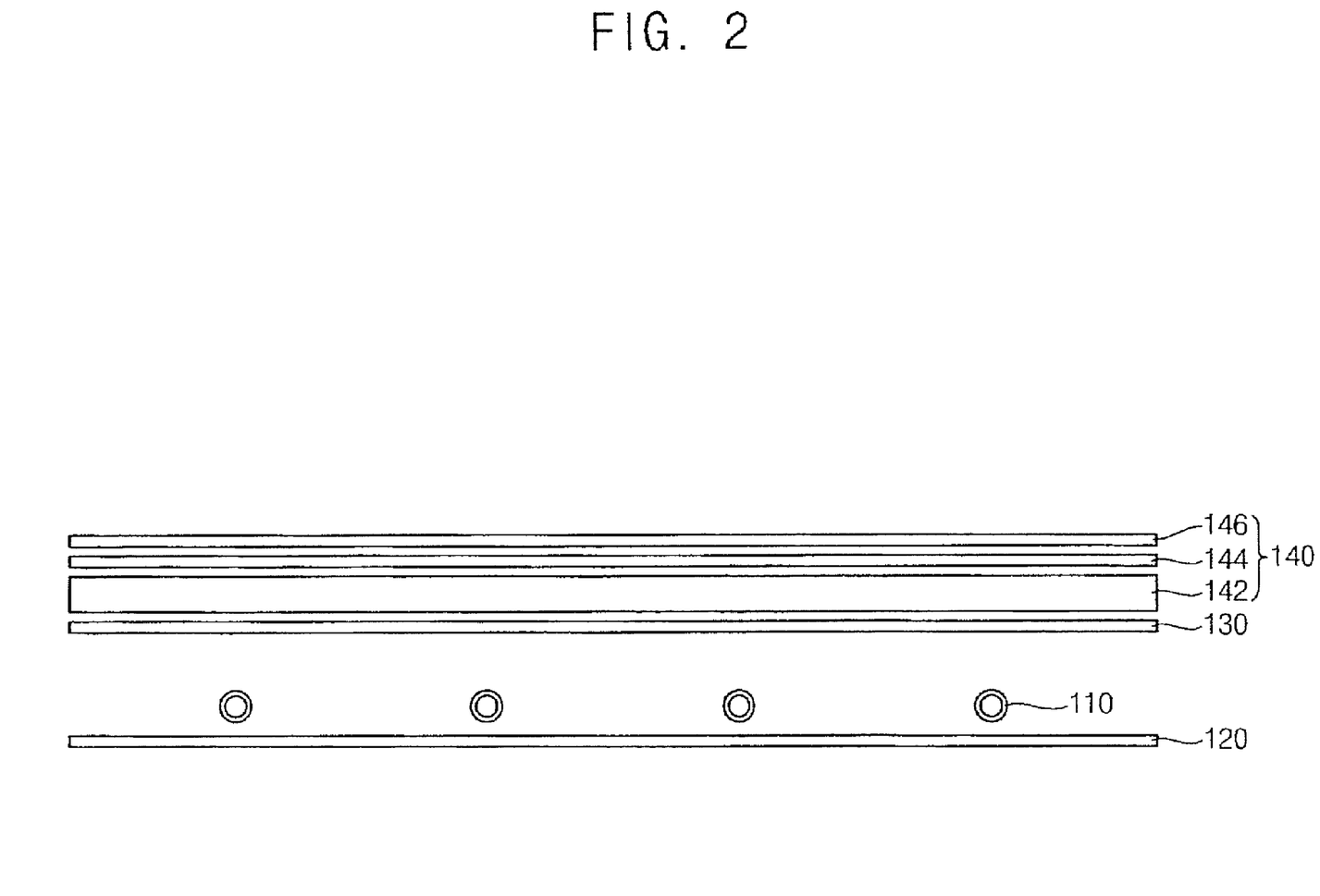
FIG. 2 is a cross-sectional view illustrating the backlight assembly in FIG. 1.

FIG. 1 is an exploded perspective view illustrating an exemplary embodiment of a backlight assembly according to the present invention. FIG. 2 is a cross-sectional view illustrating the backlight assembly in FIG. 1.

Referring to FIGS. 1 and 2, a backlight assembly 100 includes a plurality of lamps 110, a bottom reflecting plate 120, a perforated reflecting plate 130 and an optical member 140.

The lamps 110 are disposed substantially parallel with each other. The lamps 110 emit light in response to a driving voltage applied from an external inverter (not illustrated).

The lamps 110 may include a cold cathode fluorescent lamp ("CCFL") having a relatively thin and long cylindrical shape. In exemplary embodiments, the lamps 110 may have a bent "U"-like shape. The lamps 110 may also include an external electrode fluorescent lamp ("EEFL"). In one exemplary embodiment, the lamps 110 are arranged with substantially equal intervals for luminance uniformity.

The bottom reflecting plate 120 is disposed under the lamps 110. The bottom reflecting plate 120 reflects the incident light from the lamps 110 and/or the perforated reflecting plate 130 in an upward direction toward the optical member 140. The bottom reflecting plate 120 may include a material having a high optical reflectivity. In exemplary embodiments, the bottom reflecting plate 120 includes polyethylene terephthalate ("PET") or polycarbonate ("PC").

The perforated reflecting plate 130 is disposed over the lamps 110. The perforated reflecting plate 130 reflects the incident light from the lamps 110 and/or the bottom reflecting plate 120 in a downward direction toward the bottom reflecting plate 120.

The perforated reflecting plate 130 may include a material having a high optical reflectivity. In one exemplary embodiment, the perforated reflecting plate 130 includes polyethylene terephthalate ("PET") or polycarbonate ("PC"). In exemplary embodiments, the perforated reflecting plate 130 may have a reflectivity of about 95% or more for increasing an optical efficiency. In an alternative embodiment, the perforated reflecting plate 130 may include a reflective layer disposed on a base material to achieve the desired reflectivity.

The perforated reflecting plate 130 has a plurality of penetration holes 132 to transmit light. An area of the perforated reflecting plate 130 occupied by the plurality of penetration holes 132 is considered a 'transmission region' of the perforated reflecting plate 130. An area of the perforated reflecting plate 130 not occupied by the plurality of penetration holes 132 (e.g. where light is reflected) is considered a 'reflective region' of the perforated reflecting plate 130.

The light generated by the lamps 110 is repeatedly reflected by the bottom reflecting plate 120 and the perforated reflecting plate 130 (e.g., by the reflective region), and eventually exits upward through the penetration holes 132 (e.g., through the transmission region) of the perforated reflecting plate 130. In one exemplary embodiment, a portion of the light generated by the lamps 110 initially exits upward through the penetration holes 132 of the perforated reflecting plate 130. A remainder of the light is initially reflected by the perforated reflecting plate 130 toward the bottom reflecting plate 120. The light reflected toward the bottom reflecting plate 120 may be reflected again by the bottom reflecting plate 120 toward the perforated reflecting plate 130. In this case, a portion of the light reflected by the bottom reflecting plate 120 exits upward through the penetration holes 132 and a remaining portion of the light is reflected again toward the bottom reflecting plate 120. In this way, the light that does not exit upward through the penetration holes 132 of the perforated reflecting plate 130 repeats reflection and penetration, and ultimately most of the light may exit upward through the penetration holes 132 of the perforated reflecting plate 130.

The optical member 140 is disposed over the perforated reflecting plate 130. The optical member 140 improves luminance characteristics of the light passing through the perforated reflecting plate 130.

As illustrated in FIG. 1, the optical member 140 may include a diffusing plate 142 that diffuses the light passing through the perforated reflecting plate 130 to improve luminance uniformity. The diffusing plate 142 has a substantially plate shape having a predetermined thickness to support optical sheets 144 and 146. The diffusing plate 142 may include a transparent material for transmitting light and a diffusing material for diffusing light. In one exemplary embodiment, the diffusing plate 142 includes polymethyl methacrylate ("PMMA").

The perforated reflecting plate 130 may sag or bend because of having a relatively thin sheet shape. In an exemplary embodiment, the sagging and the bending of the perforated reflecting plate 130 may be reduced or effectively prevented by attaching and fixing the perforated reflecting plate 130 to a bottom surface of the diffusing plate 142.

In an exemplary embodiment, the optical member 140 may further include a diffusing sheet 144 disposed over the diffusing plate 142. The diffusing sheet 144 diffuses the light diffused by the diffusing plate 142 once more to further improve luminance uniformity.

In an exemplary embodiment, the optical member 140 may further include a condensing sheet 146 disposed over the diffusing plate 142. The condensing sheet 146 condenses the light diffused by the diffusing plate 142 and/or the diffusing sheet 144, in a substantially vertical direction to improve front-view brightness.

In an exemplary embodiment, the optical member 140 may further include a reflect-polarizing sheet (not shown) to improve brightness through a method of transmitting light satisfying a specific condition and reflecting the rest of light. The optical member 140 may also further include another optical sheet (not shown) having various functions according to required optical characteristics.

When the perforated reflecting plate 130 having a plurality of penetration holes 132 is disposed between the lamps 110 and the diffusing plate 142, luminance uniformity may be achieved through the perforated reflecting plate 130 before the light generated by the lamps 110 reaches the diffusing plate 142. Advantageously, a distance between the bottom reflecting plate 120 and the diffusing plate 142 may be reduced to a substantially equal (or minimal) level when compared to a conventional edge-illumination type backlight assembly.

In one exemplary embodiment, the perforated reflecting plate 130 and the bottom reflecting plate 120 are separated from each other by a separation distance of about 5 millimeters (mm) to about 10 millimeters (mm). Accordingly, a total thickness of the backlight assembly 100 may be considerably reduced as compared with a conventional direct-illumination type backlight assembly. Additionally, an optical efficiency may be improved due to improved transmittance by the diffusing plate 142. Moreover, a number of the lamps 110 may be reduced, so that a manufacturing cost may be reduced.

Figure 3:
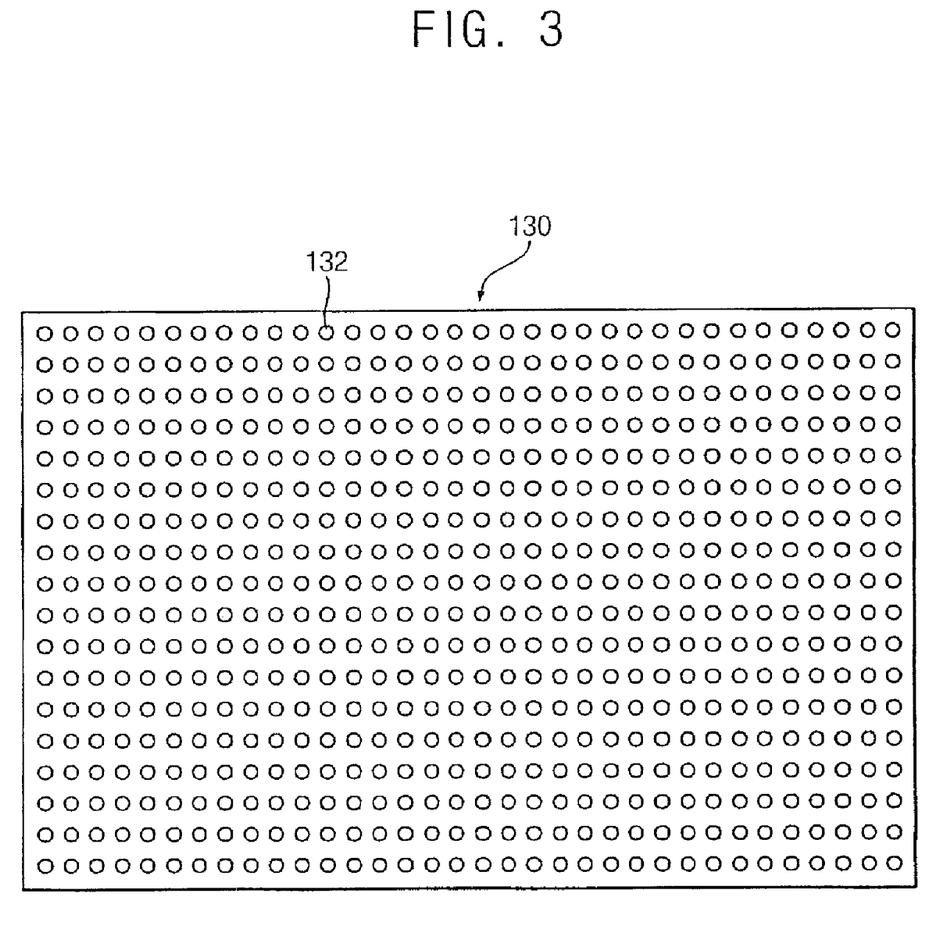
FIG. 3 is a plan view illustrating an exemplary embodiment of the perforated reflecting plate in FIGS. 1 and 2.

FIG. 3 is a plan view illustrating an exemplary embodiment of the perforated reflecting plate in FIGS. 1 and 2.

Referring to FIGS. 2 and 3, the perforated reflecting plate 130 may include a material having a high optical reflectivity. In one exemplary embodiment, the perforated reflecting plate 130 includes polyethylene terephthalate ("PET") or polycarbonate ("PC") that has a reflectivity of about 95% or more.

The penetration holes 132 may be formed within a whole area of the perforated reflecting plate 130 with a substantially uniform formation density as illustrated in FIG. 3. The penetration holes 132 have a predetermined size for transmitting light efficiently. The penetration holes 132 may have substantially a circular shape. In one exemplary embodiment, the size (e.g. a diameter) of the penetration holes 132 may be in a range of about 10 micrometers ($\mu$m) to about 100 micrometers ($\mu$m.) In alternative embodiment, the penetration holes 132 may have various shapes such as a quadrilateral, a polygonal, etc. The penetration holes 132 may be formed larger or smaller, in varying density across the area of the perforated reflecting plate 130 and/or on a portion of the perforated reflecting plate 130 from the embodiment illustrated in FIG. 3.

When the penetration holes 132 are formed so that the formation density thereof varies according to a position of the lamps, luminance uniformity of the light passing through the perforated reflecting plate 130 may be improved further.

Figure 4:
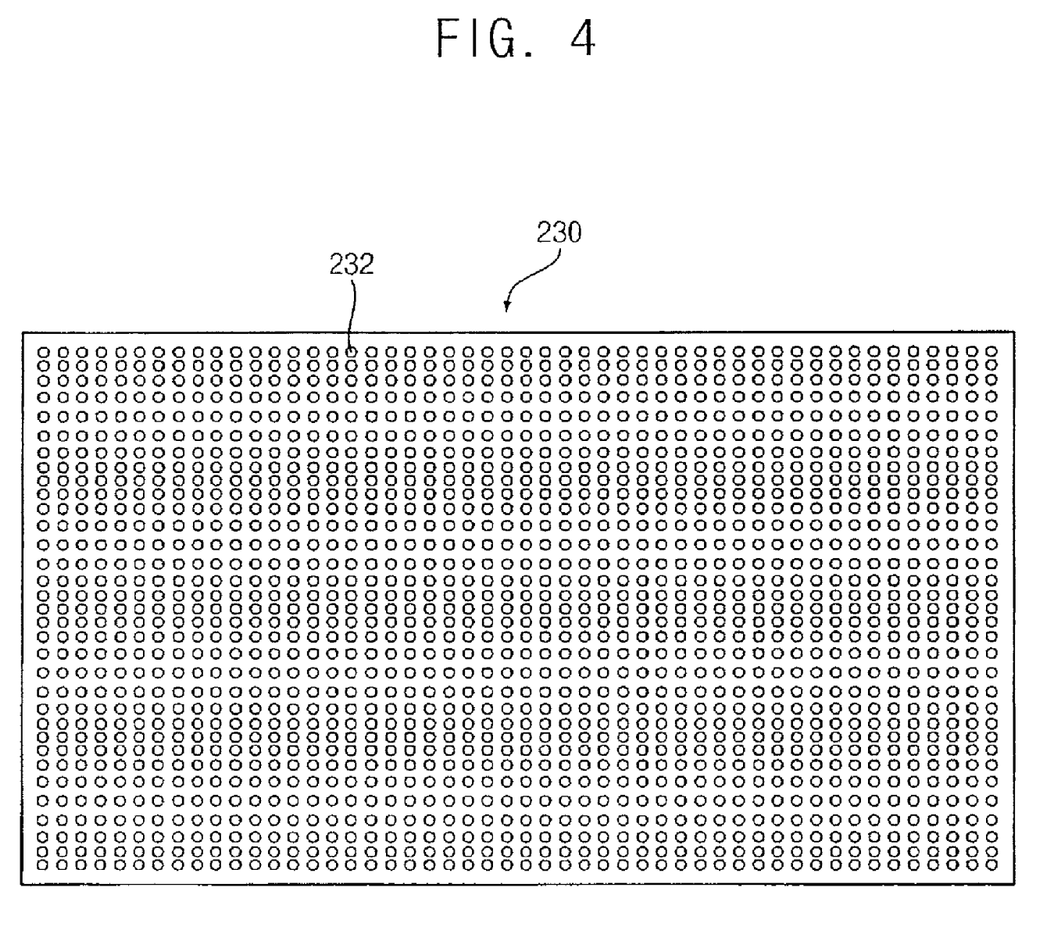
FIG. 4 is a plan view illustrating another exemplary embodiment of a perforated reflecting plate according to the present invention.
Figure 5:
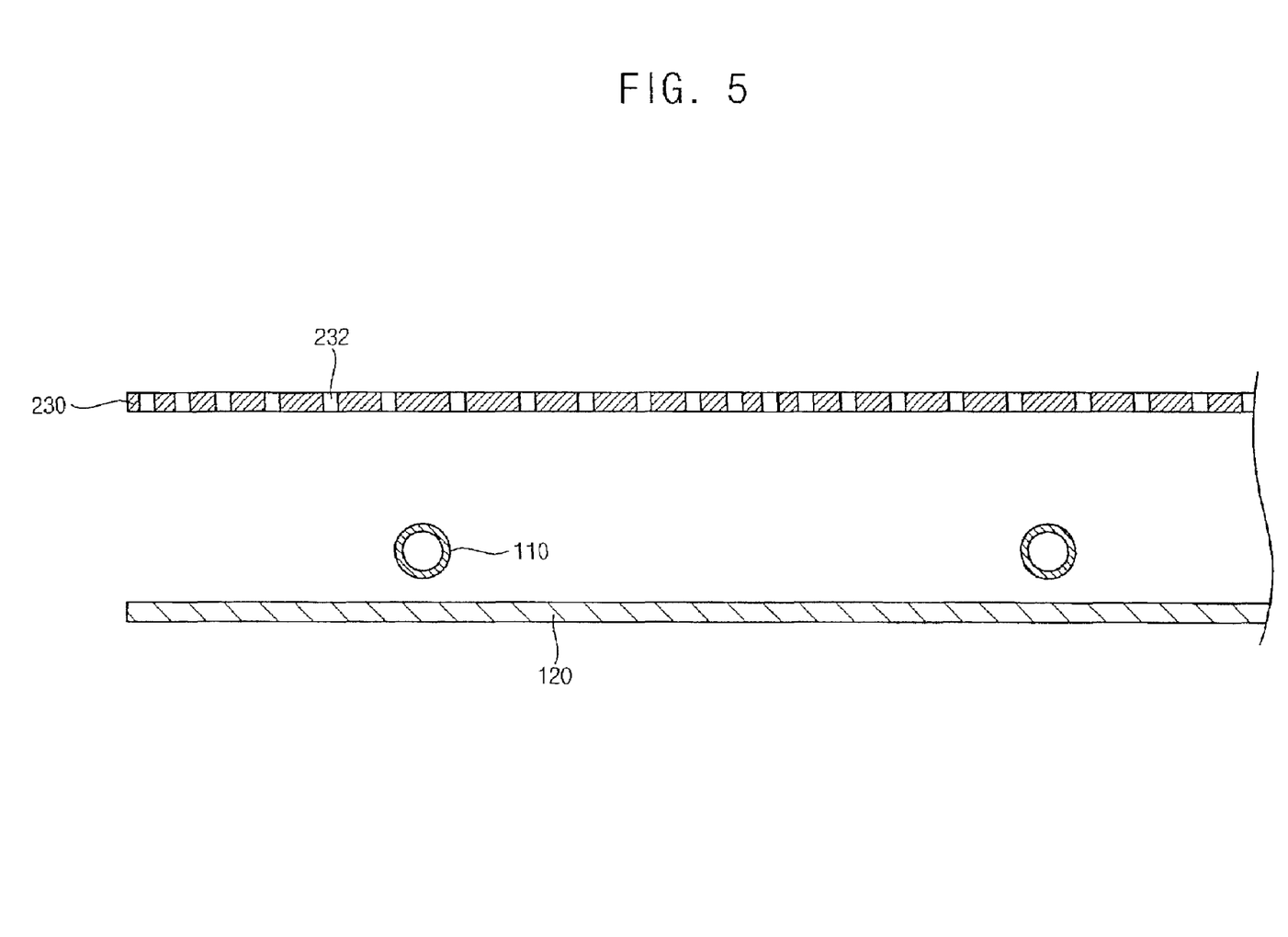
FIG. 5 is a cross-sectional view illustrating an exemplary embodiment of a positional relationship between the perforated reflecting plate and the lamps in FIG. 4.

FIG. 4 is a plan view illustrating another exemplary embodiment of a perforated reflecting plate according to the present invention. FIG. 5 is a cross-sectional view illustrating an exemplary embodiment of a positional relationship between the perforated reflecting plate and the lamps in FIG. 4. The cross-sectional view of FIG. 5 is taken in a direction perpendicular to a longitudinal direction (e.g., transverse) of the perforated reflecting plate 230 illustrated in FIG. 4.

Referring to FIGS. 4 and 5, a perforated reflecting plate 230 includes a plurality of penetration holes 232 where a formation density varies according to a position of the penetration holes 232 relative to the lamps 110.

The penetration holes 232 may be formed so that the formation density of the penetration holes 232 correspondingly varies to a position of the lamps 110 for improving luminance uniformity. As used herein, "correspondingly" may be considered as corresponding substantially in size or positional placement relative to the lamps. As in the illustrated embodiment of FIGS. 4 and 5, the formation density of the penetration holes 232 in a transverse direction of the perforated reflecting plate 230 increases as a position of the penetration holes 232 approaches a region corresponding to an region between adjacent or neighboring lamps 110 (hereinafter, 'intermediate region') from a region corresponding to a position of the lamps 110 (hereinafter, 'lamp region'). Light passes through the penetration holes 232 having a relatively lower formation density in the lamp region at which relatively more light reaches. Light passes through the penetration holes 232 having a relatively higher formation density in the intermediate region at which relatively less light reaches. Advantageously, the luminance uniformity of the light passing through the perforated reflecting plate 230 may be further improved.

As illustrated in FIG. 4, the formation density of the penetration holes 232 may be controlled by changing a number of the penetration holes 232 having a substantially same size. In one exemplary embodiment, relatively less of the penetration holes 232 are formed in the lamp region and relatively more of the penetration holes 232 are formed in the intermediate region. An area exposed by the penetration holes 232 may be varied such that an increased area is formed in the intermediate region and an area relatively lower than that of the intermediate region is formed in the lamp region. Accordingly, the formation density of the penetration holes 232 may be controlled.

In alternative embodiments, the size of the penetration holes 232 and/or the number of the penetration holes 232 may be changed to control the formation density of the penetration holes 232 instead of changing the number of the penetration holes 232 of a substantially same size. The penetration holes 232 may be spaced in substantially equal intervals in a longitudinal direction of the perforated reflecting plate 230 while intervals in a transverse direction vary as to achieve a higher formation density of the penetration holes in lamp regions. The area of the penetration holes 232 may correspondingly be varied to improve luminance uniformity.

Figure 6A:
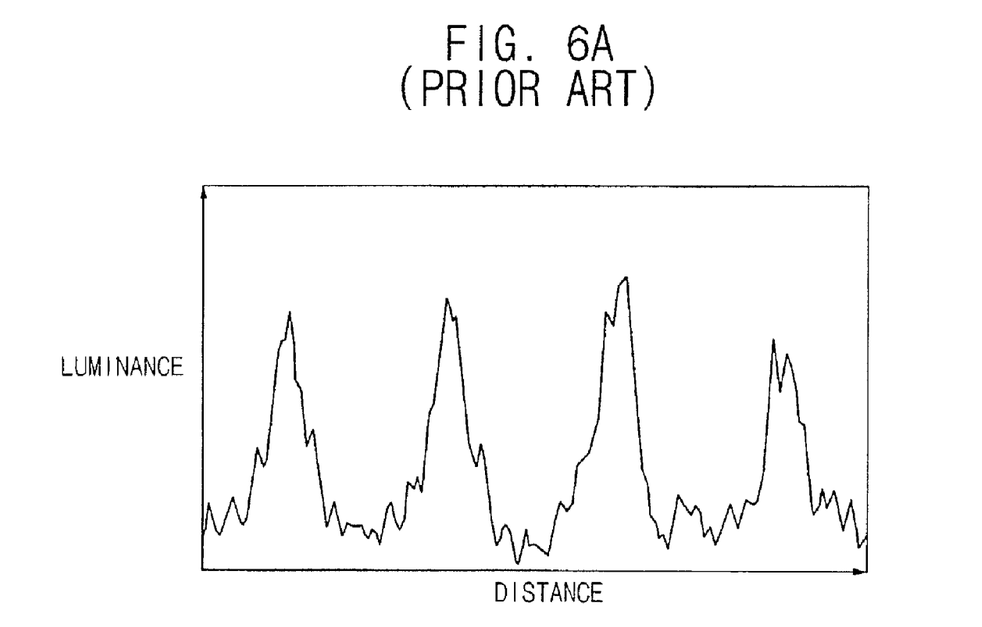
FIGS. 6A and 6B are graphs showing a luminance distribution of a conventional backlight assembly and a backlight assembly according to the present invention, respectively.
Figure 6B:
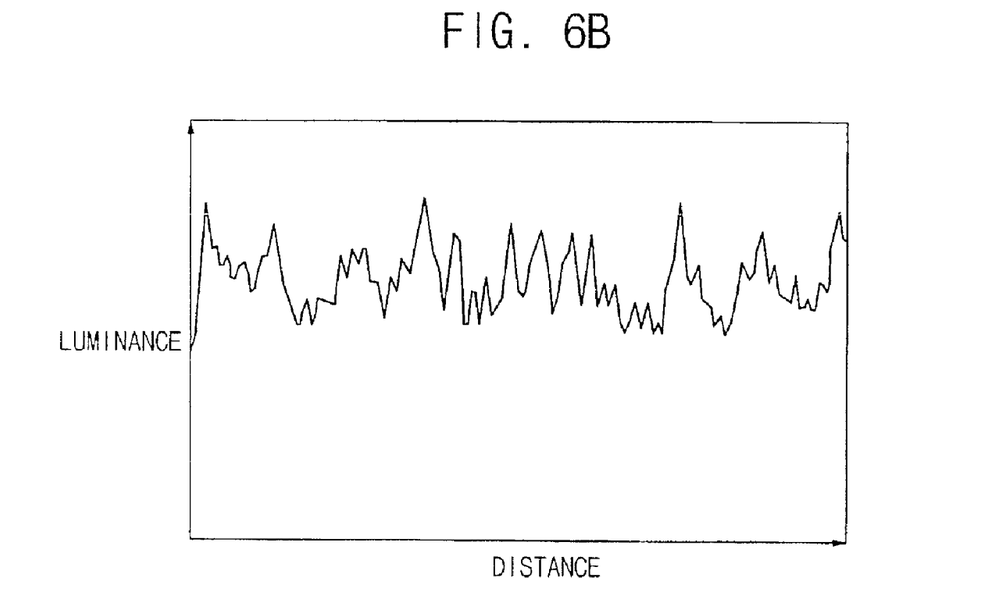

FIGS. 6A and 6B are graphs showing a luminance distribution of a conventional backlight assembly and a backlight assembly according to the present invention, respectively. FIG. 6A shows a luminance distribution where the perforated reflecting plate is not used, and FIG. 6B shows a luminance distribution where the perforated reflecting plate is used.

In FIGS. 6A and 6B, 'distance' of the X-axis represents a distance (or positions) between end portions of a backlight assembly along a direction perpendicular (e.g. transverse) to a longitudinal direction of a lamp. A Y-axis represents a luminance of light emitted from the backlight assembly.

Referring to FIG. 6A, when the perforated reflecting plate is not employed, a luminance in the lamp region is relatively high and a luminance in the intermediate region is relatively very low, such that the luminance variation related to a position in a transverse direction across the backlight assembly is relatively large.

However, referring to FIG. 6B, when the perforated reflecting plate is employed, the luminance variation related to a position in a transverse direction across the backlight assembly is considerably reduced in comparison with that of FIG. 6A, thereby showing an improvement in luminance uniformity.

As in the illustrated exemplary embodiments, a perforated reflecting plate having a plurality of penetration holes whose formation density varies correspondingly to a position of lamps, such that luminance uniformity of penetrating light may be improved. Accordingly, an optical transmittance of a diffusing plate may be improved. Advantageously, the number of the lamps may be reduced as compared with a conventional direct-illumination type backlight assembly, so that a manufacturing cost may be reduced.

Figure 7:
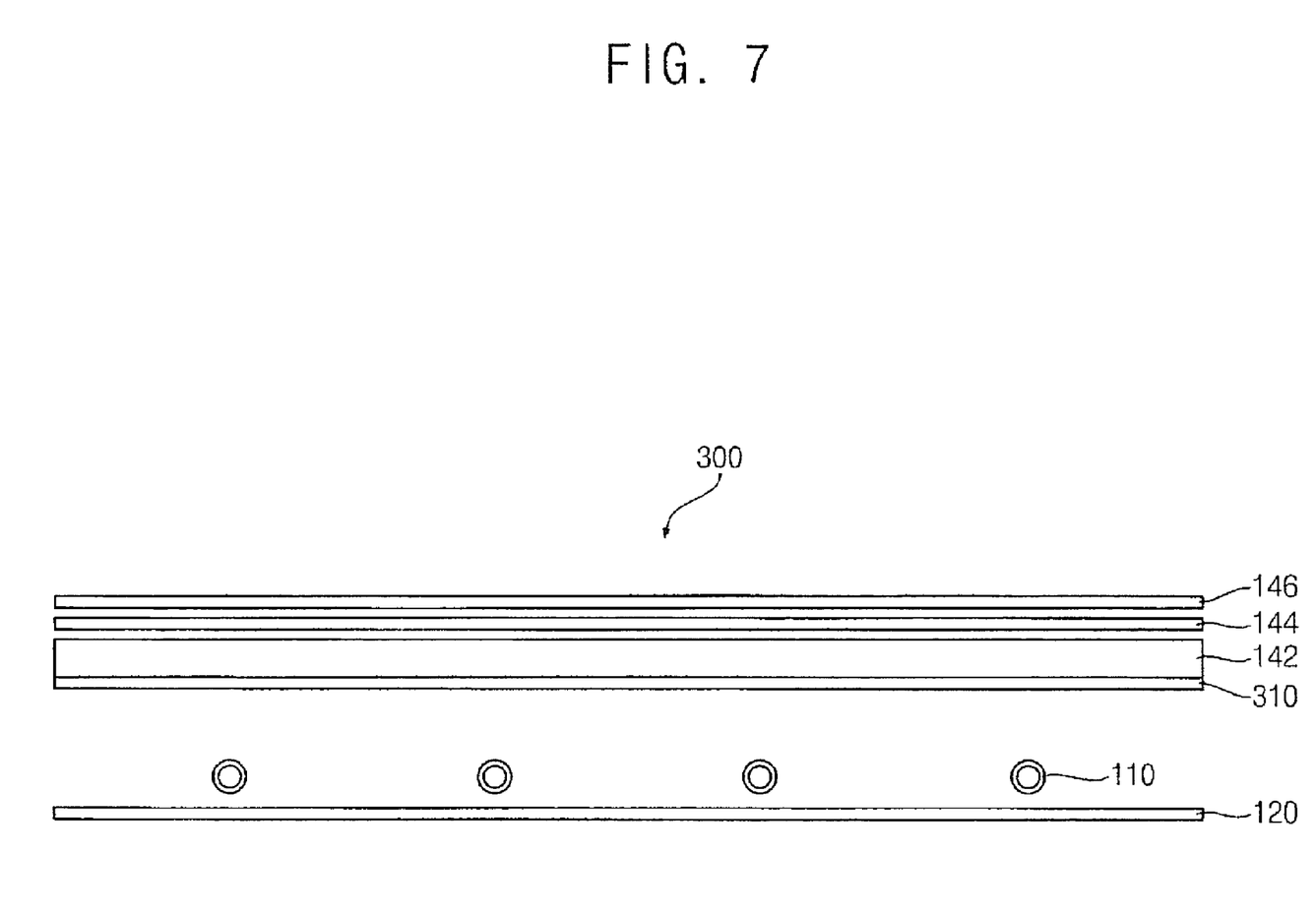
FIG. 7 is a cross-sectional view illustrating another exemplary embodiment of a backlight assembly according to the present invention.
Figure 8:
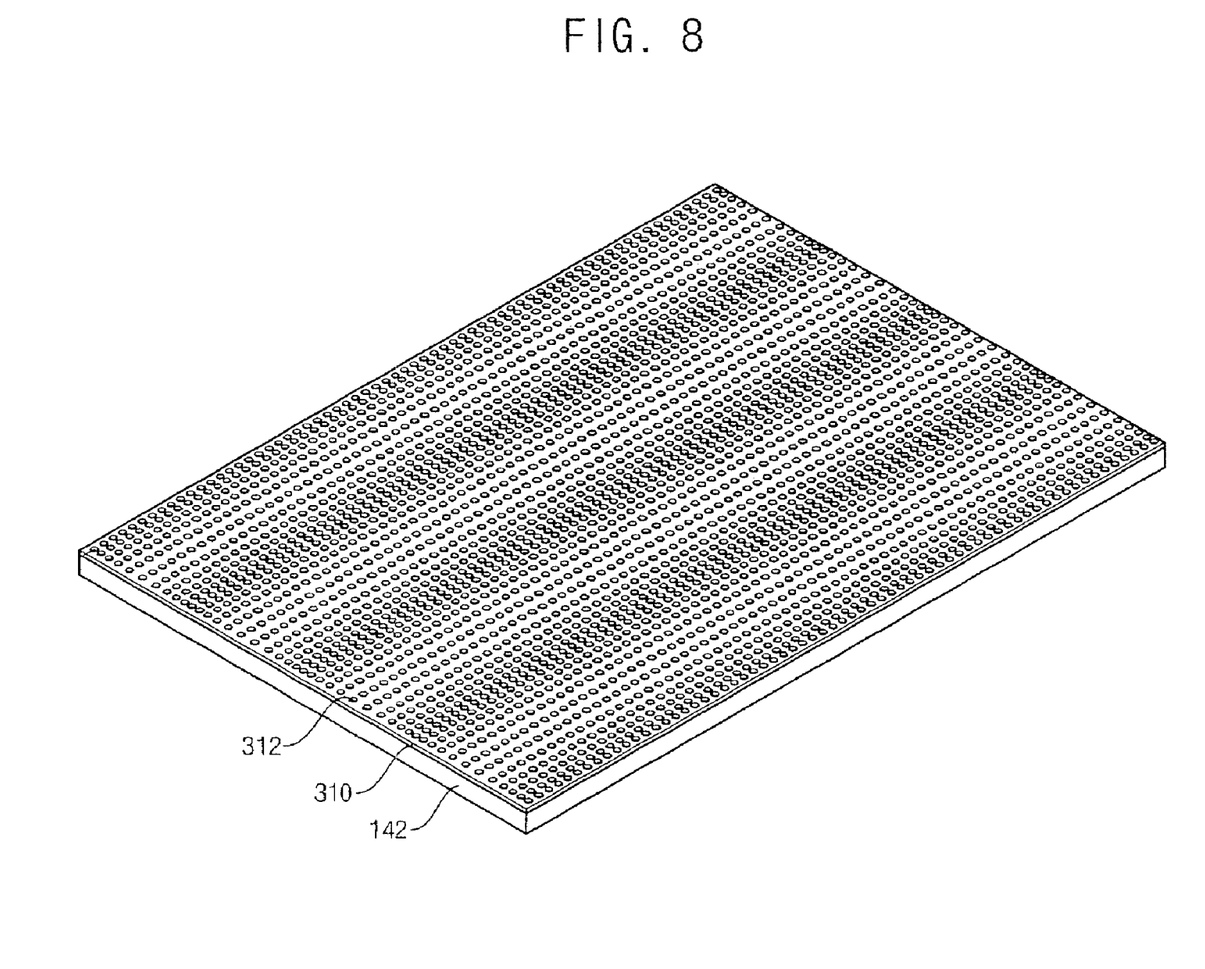
FIG. 8 is a perspective view illustrating an exemplary embodiment of the diffusing plate and the printed pattern layer in FIG. 7.

FIG. 7 is a cross-sectional view illustrating another exemplary embodiment of a backlight assembly according to the present invention. FIG. 8 is a perspective view illustrating an exemplary embodiment of the diffusing plate and the printed pattern layer in FIG. 7.

The backlight assembly 300 in FIG. 7 has a substantially same structure as the backlight assembly in FIGS. 1 to 5, except that a printed pattern layer 310, which is formed at a bottom surface of the diffusing plate 142 facing the lamps 110, substitutes for the perforated reflecting plate. Therefore, the same or corresponding reference number will be used to refer to the same or similar parts as those described in FIGS. 1 to 5, and detailed descriptions of the same elements will be omitted.

Referring to FIGS. 7 and 8, a printed pattern layer 310 for reflecting and transmitting light is formed at a bottom surface of the diffusing plate 142 facing the lamps 110. The printed pattern layer 310 may be formed by printing a white ink having a high optical reflectivity on the bottom surface of the diffusing plate 142 with a predetermined pattern, such that the printed pattern layer 310 is considered as being attached and fixed to the bottom surface of the diffusing plate 142.

A plurality of penetration holes 312 (e.g. an absence of the printed pattern) for transmitting the light is formed at the printed pattern layer 310. The penetration holes 312 are formed so that a formation density (e.g. area) of the penetration holes 312 increases as a position thereof approaches a region corresponding to an intermediate region between the neighboring lamps (namely, 'intermediate region') from a region corresponding to a position of the lamps (namely, 'lamp region'). In an alternative embodiment, the penetration holes 312 may be also formed around a whole region or partial region with a uniform formation density.

As in the illustrated embodiment of FIG. 7, the printed pattern layer 310 having a plurality of penetration holes 312 is formed at the bottom surface of the diffusing plate 142. In exemplary embodiments, the printed pattern layer 310 may be formed via a printing method. Advantageously, a substantially same effect as using a separate element, such as the perforated reflecting plate, may be achieved even without the separate perforated reflecting plate. The pattern layer 310 is considered as disposed onto a surface of the diffusing plate 142 and being integral with the diffusing plate 142. As used herein, "integral" is used to indicate that the pattern layer 310 and the diffusion plate 142 are formed to be a single unit or element rather than combining separate elements.

Figure 9:
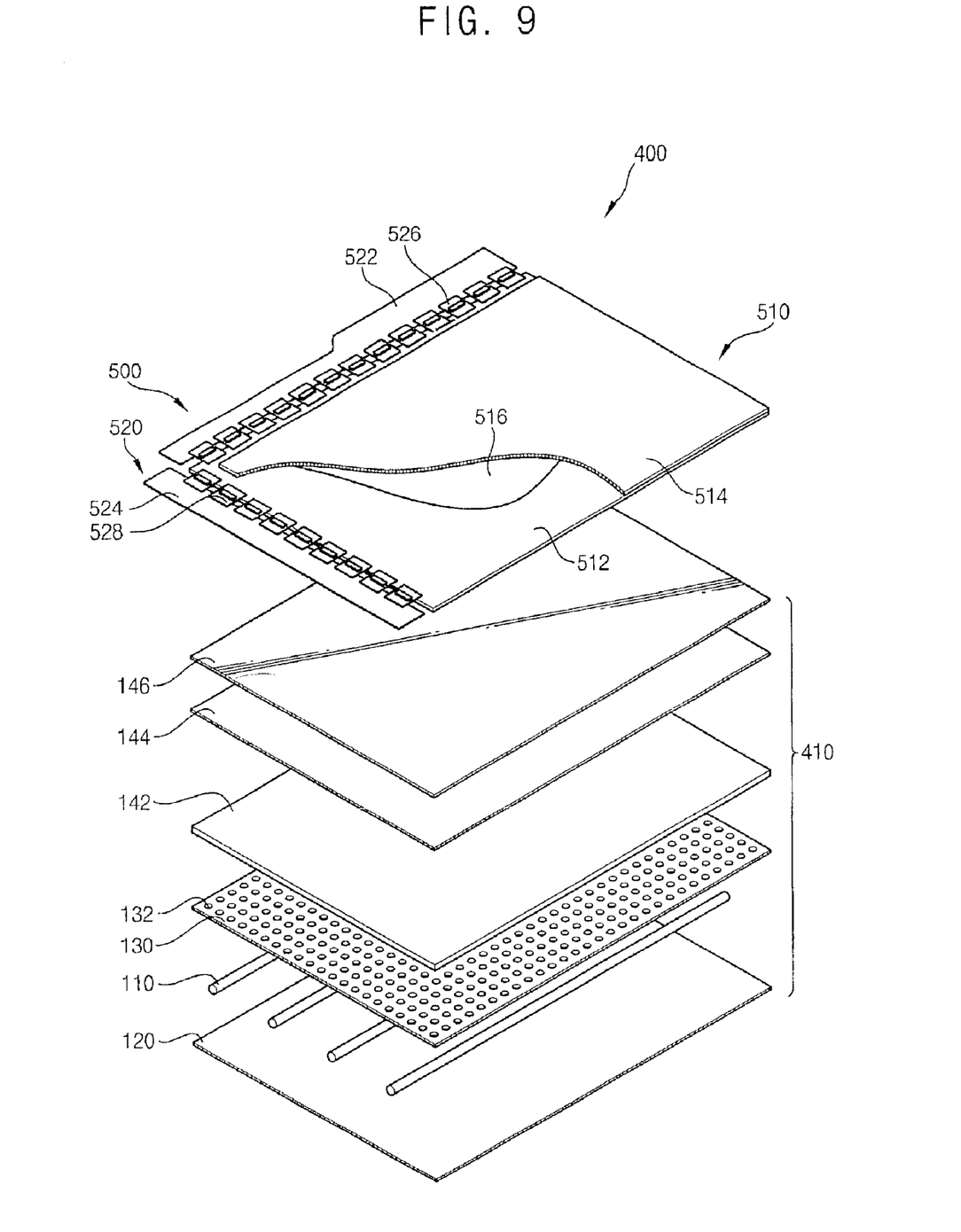
FIG. 9 is an exploded perspective view illustrating an exemplary embodiment of a display apparatus according to the present invention.

FIG. 9 is an exploded perspective view illustrating an exemplary embodiment of a display apparatus according to the present invention.

Referring to FIG. 9, a display apparatus 400 includes a backlight assembly 410 producing light and a display unit 500 displaying images.

The backlight assembly 410 may have a substantially same structure as the backlight assembly in FIGS. 1 to 8. Therefore, repeated descriptions of the same elements will be omitted.

The display unit 500 includes a display panel 510 displaying the images by using the light generated by the backlight assembly 410 and a driving circuit part 520 for driving the display panel 510.

The display panel 510 includes a first substrate 512, a second substrate 514 to be combined with the first substrate 512, and a liquid crystal layer 516 disposed between the first substrate 512 and the second substrate 514.

As illustrated in the exemplary embodiment, the first substrate 512 is a thin film transistor substrate at which a plurality of thin film transistors (not shown), considered as switching elements, are formed in a matrix shape. Source terminals and gate terminals of the thin film transistors are electrically connected to a data line (not shown) and a gate line (not shown), respectively. Drain terminals of the thin film transistors are connected to a pixel electrode (not shown) including a transparent conductive material.

The second substrate 514 is a color filter substrate at which a thin film red-green-blue ("RGB") color filter for producing colors is formed. A common electrode (not shown) including a transparent conductive material is formed at the second substrate 514. In an alternative embodiment, the color filter may be formed on the first substrate 512 instead of the second substrate 514

The driving circuit part 520 includes a data printed circuit board 522 providing the display panel 510 with a data driving signal, a gate printed circuit board 524 providing the display panel 510 with a gate driving signal, a data driving circuit film 526 connecting the data printed circuit board 522 to the display panel 510, and a gate driving circuit film 528 connecting the gate printed circuit board 524 to the display panel 510.

In exemplary embodiments, the data driving circuit film 526 and the gate driving circuit film 528 may include a tape carrier package ("TCP") on which a data driving chip and a gate driving chip are mounted. Alternatively, the data driving circuit film 526 and/or the gate driving circuit film 528 may include a chip on film ("COF"). In an exemplary embodiment, the gate printed circuit board 524 may be excluded when signal lines are formed at the display panel 510 and the gate driving circuit film 528.

As in the illustrated embodiments, a perforated reflecting plate having a plurality of penetration holes is disposed over lamps, so that an overall thickness of a backlight assembly may be reduced.

As in the illustrated exemplary embodiments, luminance uniformity of penetrating light may be improved by employing a perforated reflecting plate having a plurality of penetration holes whose formation density varies correspondingly to a position of the lamps. Accordingly, an optical transmittance may be improved. Advantageously, a number of the lamps may be reduced, so that a manufacturing cost may be retrenched.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A direct backlight assembly comprising:
A plurality of elongated lamps disposed substantially parallel with each other, the lamps generating light; and
a first reflecting plate disposed over the lamps in the direct backlight assembly, the first reflecting plate including a plurality of penetration holes spaced in a longitudinal direction of the first reflecting plate and in a transverse direction of the first reflecting plate,
wherein a formation density of the penetration holes increases as a position of the penetration holes approaches an intermediate region between adjacent lamps from a region corresponding to a position of the lamps.

2. The direct backlight assembly of claim 1, wherein a diameter of the penetration holes is in a range of about 10 μm (micrometers) to about 100 μm (micrometers).

3. The direct backlight assembly of claim 1, wherein the first reflecting plate includes polyethylene terephthalate ("PET") or polycarbonate ("PC").

4. The direct backlight assembly of claim 1, further comprising a second reflecting plate disposed under the lamps.

5. The direct backlight assembly of claim 4, wherein a distance between the first reflecting plate and the second reflecting plate is in a range of about 5 millimeters (mm) to about 10 millimeters (mm).

6. The direct backlight assembly of claim 1, further comprising an optical member disposed over the first reflecting plate, the optical member including:
a diffusing plate diffusing the light passing through the first reflecting plate;
a diffusing sheet disposed over the diffusing plate; and
a condensing sheet disposed over the diffusing plate.

7. The direct backlight assembly of claim 6, wherein the first reflecting plate is attached and fixed to a bottom surface of the diffusing plate.

8. The direct backlight assembly of claim 1, wherein the penetration holes are spaced at substantially the same interval in the longitudinal direction of the first reflecting plate and in varying intervals in the transverse direction of the first reflecting plate, such that a formation density of the penetration holes increases as a position of the penetration holes approaches an intermediate region between adjacent lamps from a region corresponding to a position of the lamps.

9. A direct backlight assembly comprising:
a plurality of elongated lamps disposed substantially in parallel with each other, the lamps generating light;
a bottom reflecting plate disposed under the lamps in the direct backlight assembly and reflecting the light;
a diffusing plate disposed over the lamps in the direct backlight assembly and diffusing the light; and
a printed pattern layer formed on a bottom surface of the diffusing plate facing the lamps, the printed pattern layer including a plurality of penetration holes transmitting the light, the penetration holes spaced in a longitudinal direction of the diffusing plate and in a transverse direction of the diffusing plate,
wherein a formation density of the penetration holes of the printed pattern layer increases as a position of the penetration holes approaches an intermediate region between adjacent lamps from a region corresponding to a position of the lamps.

10. The direct backlight assembly of claim 9, wherein the printed pattern layer is patterned with an ink reflecting light.

11. The direct backlight assembly of claim 9, wherein the penetration holes are spaced at substantially the same interval in a longitudinal direction of the diffusing plate and in varying intervals in a transverse direction of the diffusing plate, such that the formation density of the penetration holes of the printed pattern layer increases as a position of the penetration holes approaches in the intermediate region between adjacent lamps from the region corresponding to the position of the lamps.

12. The direct backlight assembly of claim 9, wherein a distance between the printed pattern layer and the bottom reflecting plate is in a range of about 5 millimeters (mm) to about 10 millimeters (mm).

13. The direct backlight assembly of claim 9, further comprising:
a diffusing sheet disposed over the diffusing plate; and
a condensing sheet disposed over the diffusing plate.

14. A display apparatus comprising:
a direct backlight assembly including:
a plurality of elongated lamps disposed substantially parallel with each other, the lamps generating light;
a bottom reflecting plate disposed under the lamps to reflect the light;
a perforated reflecting plate disposed opposite to the bottom reflecting plate with respect to the lamps, and reflecting and transmitting the light, the perforated reflecting plate including a plurality of penetration holes transmitting the light, the penetration holes spaced in a longitudinal direction of the perforated reflecting plate and in a transverse direction of the perforated reflecting plate;

an optical member disposed over the perforated reflecting plate; and a display panel disposed over the optical member, the display panel displaying images via the light passing through the optical member, wherein a formation density of the penetration holes increases as a position of the penetration holes approaches an intermediate region between adjacent lamps from a region corresponding to a position of the lamps.

15. The display apparatus of claim 14, wherein the optical member includes a diffusing plate diffusing the light passing through the perforated reflecting plate, wherein the perforated reflecting plate is attached and fixed to a bottom surface of the diffusing plate.

16. A display apparatus comprising:

a direct backlight assembly including:

a plurality of elongated lamps disposed substantially in parallel with each other, the lamps generating light;

a bottom reflecting plate disposed under the lamps to reflect the light;

a diffusing plate disposed over the lamps and diffusing the light; and a printed pattern layer formed on a bottom surface of the diffusing plate facing the lamps, the printed pattern layer being patterned with an ink to reflect the light and including a plurality of penetration holes transmitting the light, the penetration holes spaced in a longitudinal direction of the diffusing plate and in a transverse direction of the diffusing plate; and a display panel disposed over the diffusing plate, and opposite to the bottom reflecting plate with respect to the lamps, the display panel displaying images, wherein a formation density of the penetration holes of the printed pattern layer increases as a position of the penetration holes approaches an intermediate region between adjacent lamps from a region corresponding to a position of the lamps.

* * * * *